(12) United States Patent
Yang et al.

(10) Patent No.: US 10,880,420 B2
(45) Date of Patent: Dec. 29, 2020

(54) TERMINAL DEVICE

(71) Applicant: BEIJING XIAOMI MOBILE SOFTWARE CO., LTD., Beijing (CN)

(72) Inventors: Jieming Yang, Beijing (CN); Hongzhi Jin, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/693,357

(22) Filed: Nov. 24, 2019

(65) Prior Publication Data
US 2020/0344338 A1    Oct. 29, 2020

(30) Foreign Application Priority Data
Apr. 28, 2019    (CN) .......................... 2019 1 0351341

(51) Int. Cl.
*H04M 1/02*    (2006.01)
*H04N 5/225*   (2006.01)

(52) U.S. Cl.
CPC ....... *H04M 1/0264* (2013.01); *H04M 1/0249* (2013.01); *H04M 1/0254* (2013.01); *H04N 5/225251* (2018.08)

(58) Field of Classification Search
CPC ............ H04M 1/0264; H04M 1/0254; H04M 1/0249; H04N 5/225251
See application file for complete search history.

(56) References Cited

U.S. PATENT DOCUMENTS

| | | | | |
|---|---|---|---|---|
| 10,656,680 | B2* | 5/2020 | Fan ..................... | H04M 1/0237 |
| 2005/0014527 | A1* | 1/2005 | Chambers ............ | H04N 5/2256 455/556.1 |
| 2006/0261257 | A1* | 11/2006 | Hwang ................ | H04N 5/2259 250/216 |
| 2007/0253703 | A1* | 11/2007 | Tsai ..................... | H04N 5/2251 396/429 |
| 2015/0189175 | A1* | 7/2015 | Fan ..................... | H04N 5/23238 348/37 |
| 2016/0205293 | A1 | 7/2016 | Jung et al. | |

(Continued)

FOREIGN PATENT DOCUMENTS

| | | |
|---|---|---|
| CN | 103533222 B | 8/2016 |
| CN | 107197133 A | 9/2017 |

(Continued)

OTHER PUBLICATIONS

European Search Report in application No. EP19217883.8, dated May 4, 2020.

*Primary Examiner* — Jason A Flohre
(74) *Attorney, Agent, or Firm* — Syncoda LLC; Feng Ma

(57) ABSTRACT

A terminal device includes a body, a camera module and an elevating and rotating module. A hole for camera ejection and retraction is formed in a side enclosure of the body. The camera module is arranged in the body and configured to be ejected out of the body or retracted into the body through the hole for camera ejection and retraction. The elevating and rotating assembly is connected to the camera module, and configured to push the camera module to be ejected out of the body or retracted into the body through the hole for camera ejection and retraction, and to drive the camera module located outside the body to rotate along with the ejection or the retraction.

17 Claims, 4 Drawing Sheets

(56) References Cited

U.S. PATENT DOCUMENTS

| | | | | |
|---|---|---|---|---|
| 2017/0244903 A1* | 8/2017 | Yang | ............... | H04N 5/23216 |
| 2019/0014201 A1* | 1/2019 | Bao | ............... | H04N 5/23238 |
| 2020/0028999 A1* | 1/2020 | Jun | ............... | H04N 5/2254 |
| 2020/0177716 A1* | 6/2020 | Chen | ............... | H04N 5/2257 |
| 2020/0213491 A1* | 7/2020 | Huang | ............... | H04N 5/2257 |
| 2020/0244786 A1* | 7/2020 | Zeng | ............... | H04N 5/2257 |

FOREIGN PATENT DOCUMENTS

| | | |
|---|---|---|
| CN | 108600596 A | 9/2018 |
| CN | 109246342 A | 1/2019 |
| TW | 568985 U | 1/2004 |

\* cited by examiner

TERMINAL DEVICE

CROSS-REFERENCE TO RELATED APPLICATION

This application claims priority to Chinese Patent Application No. 201910351341.6 filed on Apr. 28, 2019, the disclosure of which is hereby incorporated by reference in its entirety.

BACKGROUND

An integrated design of a full-screen display and with opening has become an important development trend of mobile phones. However, the mobile phone is usually provided with a camera module, and thus a back cover and/or a display surface of the mobile phone are/is provided with a light-transmissive hole fitted with the camera module.

SUMMARY

The present disclosure relates generally to a technical field of terminal devices, and more specifically to a terminal device.

According to an embodiment of the present disclosure, a terminal device is provided, and the terminal device includes: a body including a side enclosure provided with a hole for camera ejection and retraction; a camera module provided in the body and configured to be ejected out of the body or retracted into the body through the hole for camera ejection and retraction; and an elevating and rotating assembly connected to the camera module, and configured to push the camera module to be ejected out of the body or retracted into the body through the hole for camera ejection and retraction, and to drive the camera module located outside the body to rotate along with the ejection or the retraction.

It is to be understood that the above general descriptions and the following detailed descriptions are only exemplary and explanatory and not intended to limit the present disclosure.

BRIEF DESCRIPTION OF THE DRAWINGS

Accompanying drawings herein are incorporated into the specification and form a part of the disclosure, which illustrate embodiments of the present disclosure and are used for explaining principles of the present disclosure together with the specification.

DETAILED DESCRIPTION

Exemplary embodiments will be described in detail herein, examples of which are illustrated in the accompanying drawings. Same numbers in different accompanying drawings donate same or similar elements when the following descriptions refer to the accompanying drawings, unless indicated otherwise. The examples described in the following exemplary embodiments do not represent all embodiments consistent with the present disclosure. Instead, they are merely examples of devices and methods consistent with some aspects of the present disclosure as detailed in the appended claims.

When performing image capturing, the camera module may be ejected out of a body of a terminal device. However, the terminal device provided in the related art has defects of a single usage mode and a poor image capturing effect, which affects a user experience. In addition, an integrated design cannot be satisfied due to the existence of the light-transmissive hole.

Various embodiments of the present disclosure address both the integrated design of a body of the mobile phone and an image capturing effect of the camera module.

Based on the above problems, embodiments of the present disclosure provide a terminal device. FIG. 1 through FIG. 6 are schematic views of the terminal device provided in various embodiments. A mobile phone is taken as an example in each accompanying drawing, while the terminal device according to embodiments of the present disclosure may be a mobile phone, a tablet computer, a wearable device, a medical device, etc.

Figure 1:
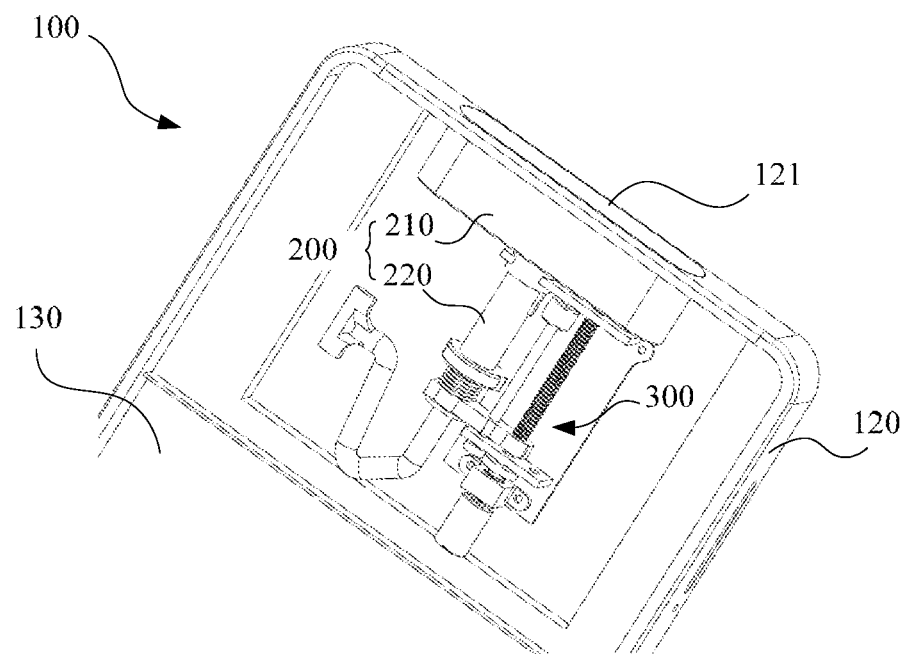
FIG. 1 is a schematic view of a terminal device according to an exemplary embodiment.
Figure 2:
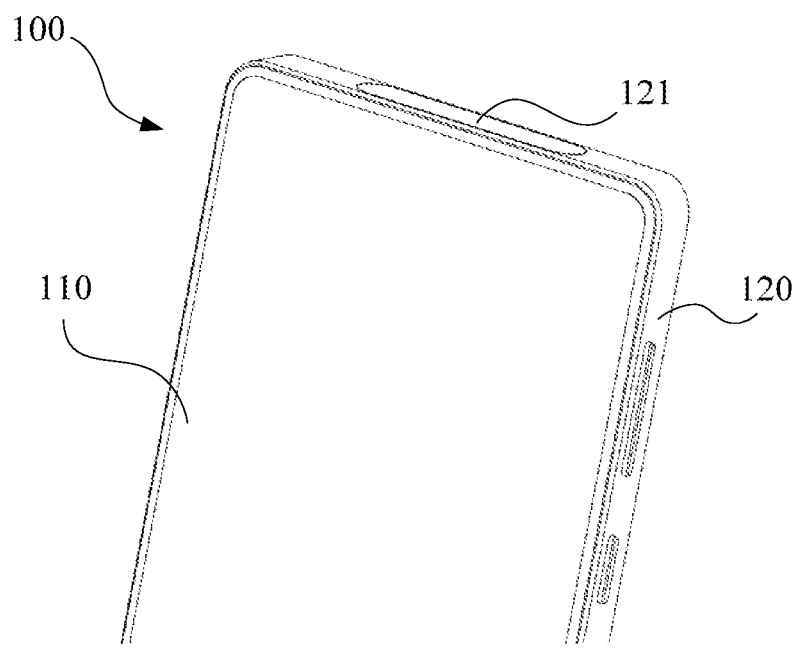
FIG. 2 is a schematic view of a terminal device in a state that a camera is not started according to an exemplary embodiment.

As illustrated in FIG. 1 and FIG. 2, the terminal device includes a body 100, a camera module, and an elevating and rotating assembly 300.

The body 100 includes a display surface 110, a side enclosure 120 connected to the display surface 110, and a back cover 130 connected to a side of the side enclosure 120 away from the display surface 110. The display surface 110, the side enclosure 120 and the back cover 130 enclose an inner cavity. The camera module 200 and the elevating and rotating assembly 300 are mounted in the inner cavity. Furthermore, a hole 121 for camera ejection and retraction is formed in the side enclosure 120 and communicates an outside of the body 100 with the inner cavity of the body 100.

Driven by the elevating and rotating assembly 300, the camera module 200 is ejected out of and retracted into the body 100 through the hole 121 for camera ejection and retraction. Optionally, the hole 121 for camera ejection and retraction is formed in a top of the body 100, and the elevating and rotating assembly 300 drives the camera module 200 to be ejected upwards out of the body 100, and to be retracted downwards into the body 100.

In an embodiment, the camera module 200 includes a main portion 210 and a connecting portion 220. At least one camera is encapsulated in the main portion 210. Optionally, the camera is selected from one or a combination of arbitrary ones of a telescope camera, a wide scope camera, a fish eye lens, and a macro lens. Furthermore, when a plurality of cameras are encapsulated in the main portion 210, an arrangement of the plurality of cameras is not limited. For example, the plurality of cameras may be arranged in a straight-line shape, a triangular shape, etc. In addition, optionally, auxiliary assemblies such as a flash light are also encapsulated in the main portion 210, so that the image capturing effect of the camera module 200 is optimized.

The connecting portion 220 protrudes from the main portion 210 so as to be connected to the elevating and rotating assembly 300. Optionally, the connecting portion 220 is disposed to a bottom wall of the main portion 210. In this way, the elevating and rotating assembly 300 pushes the camera module 200 out of the body 100 from bottom to up. In addition, the connecting portion 220 is fixedly connected to the bottom wall of the main portion 210, hence ensuring stable elevation and rotation of the camera module 200.

In addition, a cable through hole is formed in the connecting portion 220, and the cable through hole is in communication with an interior of the main portion 210 and configured to accommodate a data transmission line of the camera.

The elevating and rotating assembly 300 is connected with the camera module 200 and pushes the camera module 200 to be ejected out of or retracted into the body 100 through the hole 121 for camera ejection and retraction.

During image capturing, the camera module 200 is ejected out of the body 100 through the hole 121 for camera ejection and retraction by means of the elevating and rotating assembly 300, and then images are acquired by the camera module 200 located outside the body 100. In this way, a hidden camera design is realized (as illustrated in FIG. 2), which is advantageous for reducing the number of light-transmissive holes in the body 100.

In some embodiments, when the camera module 200 is in a front image capturing position after being ejected out of the body 100, it is needless to provide the light-transmissive hole in the display surface 110, thus ensuring a full-screen display effect.

In some other embodiments, when the camera module 200 is in a rear image capturing position after being ejected out of the body 100, it is needless to provide the light-transmissive hole in the back cover 130, which is advantageous for reducing openings in the back cover 130, such that the stability and the visual effect of the back cover 130 are optimized.

In addition, the elevating and rotating assembly 300 drives the camera module 200 outside the body 100 to rotate synchronously along with the ejection or retraction of the camera module 200. In this way, the elevating and rotating assembly 300 may also be used for changing an image capturing angle of the camera module 200 while driving the camera module 200 to move up and down, thus optimizing the image capturing effect of the camera module 200.

In some embodiments, the elevating and rotating assembly 300 drives the camera module 200 to switch between the front image capturing position and the rear image capturing position.

The various device components, circuits, modules, units, blocks, or portions may have modular configurations, or are composed of discrete components, but nonetheless may be referred to as "modules" or "portions" in general. In other words, the "components," "circuits," "modules," "units," "blocks," or "portions" referred to herein may or may not be in modular forms.

Figure 3:
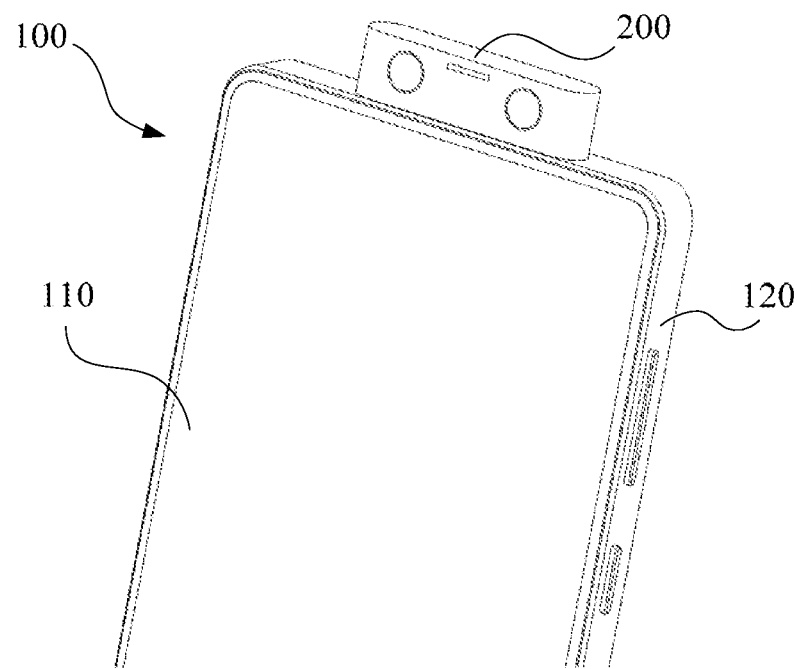
FIG. 3 is a schematic view of a terminal device in a front image capturing state according to an exemplary embodiment.

As illustrated in FIG. 3, the camera module 200 is located at the front image capturing position. In this case, the camera module 200 is equivalent to a front camera in the related art and can perform self-image capturing.

Figure 4:
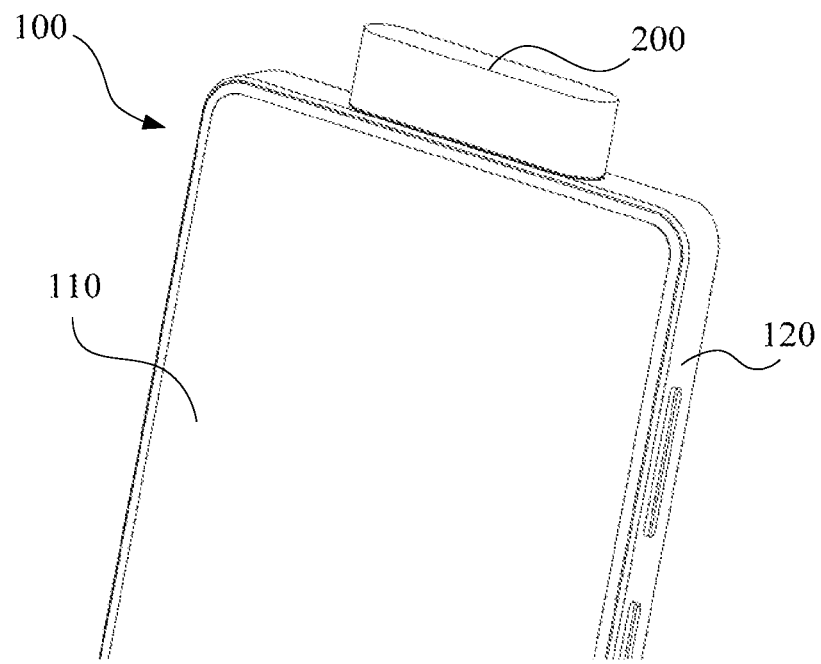
FIG. 4 is a schematic view of a terminal device in a rear image capturing state according to an exemplary embodiment.

As illustrated in FIG. 4, the camera module 200 is located at the rear image capturing position. In this case, the camera module 200 is equivalent to a rear camera in the related art and can perform a normal image capturing.

In these cases, it is needless to provide the light-transmissive holes fitted with the camera module 200 in both the display surface 110 and the back cover 130 of the body 100, so that not only the full-screen display effect is realized, but also the amount of openings in the back cover 130 is reduced, which further meets the requirement for an integrated design of the terminal device.

Moreover, in this case, it is equivalent to that the terminal device realizes the front image capturing and the rear image capturing by adopting one camera module 200. Accordingly, it is possible to adopt high-resolution and various types of cameras to realize the front image capturing, thus improving the front image capturing quality and hence optimizing the user experience.

Figure 5:
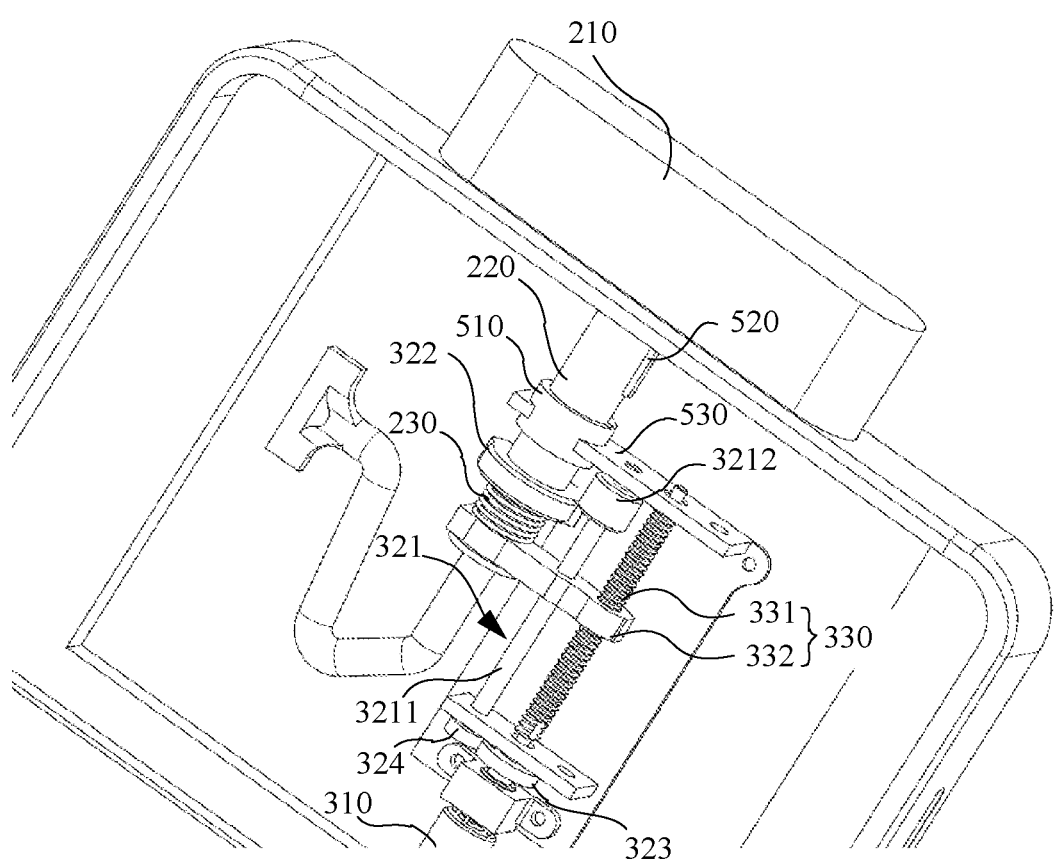
FIG. 5 is a schematic view of a terminal device in a front image capturing state according to an exemplary embodiment.
Figure 6:
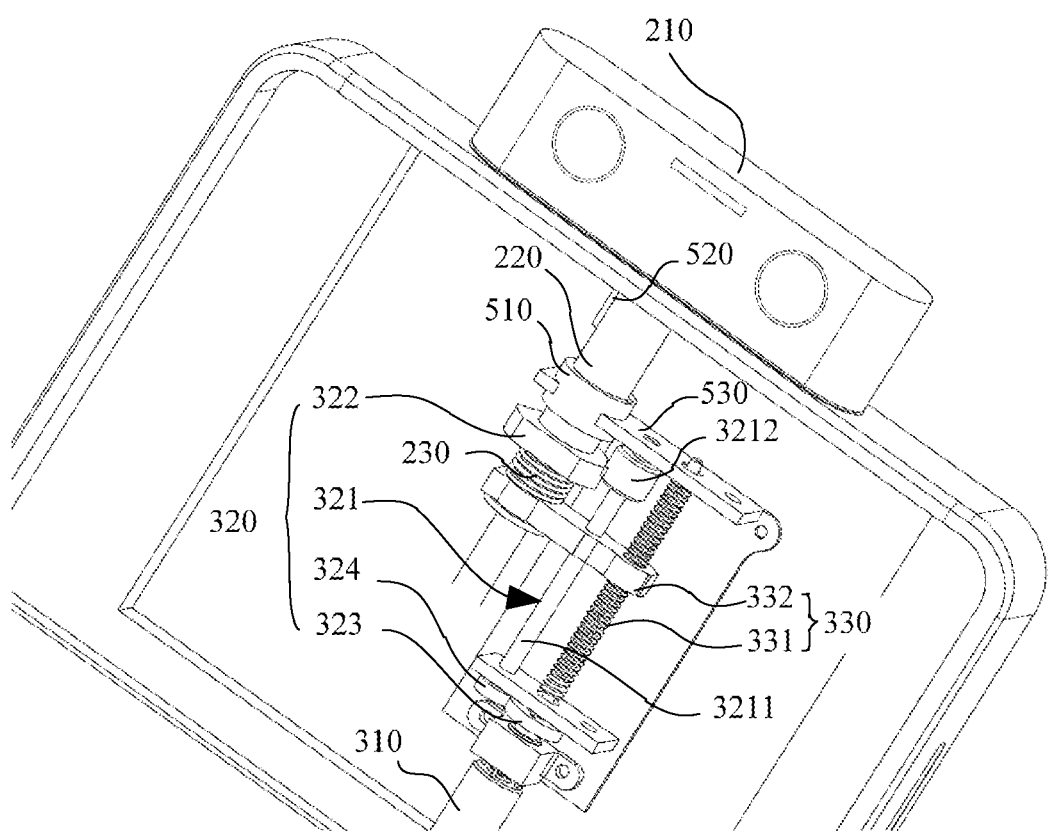
FIG. 6 is a schematic view of a terminal device in a rear image capturing state according to an exemplary embodiment.

In an embodiment, as illustrated in FIG. 1, FIG. 5 and FIG. 6, the elevating and rotating assembly 300 includes a driving element 310, a rotation transmitting element 320 connected to the driving element 310, and an elevation transmitting element 330 connected with the driving element 310. The rotation transmitting element 320 is configured to drive the camera module 200 to rotate under the drive of the driving element 310, and the elevation transmitting element 330 is configured to drive the camera module 200 to move up and down under the drive of the driving element 310.

In this way, the elevating and rotating assembly 300 can realize the rotation drive and the elevation drive by using only one driving element 310, which significantly reduces a hardware cost of the terminal device. In addition, by adopting only one driving element 310, it is advantageous for reducing an overall volume of the elevating and rotating assembly 300, so as to facilitate the installation of the elevating and rotating assembly 300 in the body 100.

In an embodiment, as illustrated in FIG. 5 and FIG. 6, the rotation transmitting element 320 includes a first rotating element 321 and a second rotating element 322 configured to be engaged with the first rotating element 321. The first rotating element 321 is connected to the driving element 310 in a transmission way and rotates along with the driving element 310, and the second rotating element 322 is in connection with the camera module 200.

In some embodiments, the second rotating element 322 is disposed to the connecting portion 220 of the camera module 200 and located at an end of the connecting portion 220 away from the main portion 210. For example, the second rotating element 322 is a transmission gear fitted over the connecting portion 220. In this way, the second rotating element 322 is ejected or retracted synchronously along with the camera module 200.

The transmission is realized when the second rotating element 322 is ejected along with the camera module 200 to be engaged with the first rotating element 321, so as to drive the camera module 200 to rotate. Apparently, when the second rotating element 322 is retracted along with the camera module 200 to be disengaged with the first rotating element 321, the camera module 200 is not driven to rotate anymore.

In this way, in the condition that the elevating and rotating assembly 300 only includes one driving element 310, it is possible to start the camera module 200 or stop the rotation of the camera module 200 during the ejection or retraction process. This method provides a high automatic level and a great user experience.

In an embodiment, the first rotating element 321 includes a support section 3211 and an engagement section 3212 disposed in sequence along an ejection direction of the camera module 200. An end of the support section 3211 away from the hole 121 for camera ejection and retraction is connected to the driving element 310 in a transmission way. The engagement section 3212 is connected with another end of the support section 3211 and configured to be engaged with the second rotating element 322 so as to realize the transmission. In addition, before the camera module 200 is started, the engagement section 3212 is located at a side of the second rotating element 322 close to the hole 121 for camera ejection and retraction.

During use, the second rotating element 322 is first ejected along with the camera module 200, engaged with the engagement section 3212 in the process of ejection, and thus drives the camera module 200 to rotate. Or, the second rotating element 322 located outside the body 100 is first retracted along with the camera module 200 and rotates until the second rotating element 322 is disengaged from the engagement section 3212. In this case, the camera module 200 rotates back to an initial position of the camera module 200 ejected out of the body 100, and continues retracting into the body 100. In this way, the camera module 200 can move up and down, and/or rotate smoothly, thus ensuring a normal usage of the terminal device.

In some embodiments, when the camera module 200 is not ejected, in a direction in which the camera module 200 is ejected out of the body 100, a distance between the second rotating element 322 and the engagement section 3212 is greater than a distance by which the camera module 200 is completely ejected out of the body 100.

In this way, as illustrated in FIG. 5, when the camera module 200 is completely ejected out of the body 100, the second rotating element 322 is not engaged with the engagement section 3212. If the driving element 310 is stopped at this time, the camera module 200 can stably remain at the initial position of the camera module 200 ejected out of the body 100, so as to perform the image capturing. In this way, it is possible to ensure that the front image capturing or the rear image capturing can be performed stably, especially when the initial position of the camera module 200 ejected out of the body 100 is the front image capturing position or the rear image capturing position, thus optimizing the image capturing quality.

Further, as illustrated in FIG. 6, when the camera module 200 is further driven by the elevating and rotating assembly 300 to move by a preset distance, the second rotating element 322 is connected to and engaged with the engagement section 3212, hence driving the camera module 200 to rotate.

The preset distance may be selected according to actual conditions. Apparently, the less the preset distance, the less a gap between the camera module 200 located outside the body 100 and the body 100, which thus is advantageous for optimizing the dustproof performance of the terminal device. Certainly, sealing assemblies such as a sealing ring may be provided around the hole 121 for camera ejection and retraction.

Optically, the terminal device further includes a distance sensor, such as a Hall sensor. One of an emitting portion or a receiving portion of the distance sensor is disposed to the engagement section 3212, and the other one thereof is disposed to the second rotating element 322. The distance between the second rotating element 322 and the engagement section 3212 is monitored by means of the distance sensor, so as to judge whether the camera module 200 is moved into position.

In an embodiment, the rotation transmitting element 320 further includes a first transmission element 323 disposed to an output end of the driving element 310 and a second transmission element 324 disposed to a portion of the support section 3211 away from the engagement section 3212, and the first transmission element 323 and the second transmission element 324 are engaged for transmission.

The driving element 310 drives the first transmission element 323 to rotate, the first transmission element 323 and the second transmission element 324 are engaged for transmission so as to drive the support section 3211 to rotate. Optionally, the first transmission element 323 and the second transmission element 324 are gears engaged with each other.

In an embodiment, the elevation transmitting element 330 includes a first elevating element 331 connected to the output end of the driving element 310 and configured to rotate along with the driving element 310. The first elevating element 331 is arranged along the ejection direction of the camera module 200. In some embodiments, the first elevating element 331 is a screw connected to the driving element 310, and the driving element 310 drives the screw to rotate.

The elevation transmitting element 330 further includes a second elevating element 332 connected to the first elevating element 331, and the second elevating element 332 is configured to move along a length direction of the first elevating element 331. The second elevating element 332 is fitted over the support section 3211 and connected to the camera module 200.

In some embodiments, the first elevating element 331 is a thread rod, and the second elevating element 332 includes a threaded hole in which the first elevating element 331 is threadedly connected. When the driving element 310 drives the first elevating element 331 to rotate, the second elevating element 332 moves along the length direction of the first elevating element 331 under the action of threads. In addition, the second elevating element 332 is fitted over the support section 3211. In this case, the support section 3211 plays a role of guiding and prevents the rotation of the second elevating element 332 with respect to the first elevating element 331.

The second elevating element 332 is also connected to the camera module 200. In some embodiments, the second elevating element 332 is connected to the connecting portion 220 of the camera module 200. In this way, the camera module 200 can be driven to be ejected out of or retracted into the body 100 by means of the second elevating element 332.

In some embodiments, the camera module 200 further includes an elastic buffer element 230 such as a spring, and the elastic buffer element 230 has an end connected to the second elevating element 332 and another end connected to the connecting portion 220. In addition, the elastic buffer element 230 can be stretched or contracted along the ejection direction of the camera module 200.

During the process that the elevation transmitting element 330 drives the camera module 200 to be ejected, the engagement section 3212 keeps rotating, the second rotating element 322 keeps moving up, such that there is a case where the engagement section 3212 cannot be smoothly engaged with the second rotating element 322. Specifically, following descriptions are made by taking an example that the engagement section 3212 and the second rotating element 322 are both gears.

During the process that the second rotating element 322 moves up along with the camera module 200 to be engaged with the engagement section 3212, engaging teeth of the second rotating element 322 may not be aligned with engaging grooves of the engagement section 3212. In this case, the ejection procedure of the camera module 200 is blocked. However, the second elevating member 332 continues pushing the camera module 200, such that the second rotating element 322 abuts against the engagement section 3212, which may cause the elevating and rotating assembly 300 to be stuck and thus influences the usage.

In this condition, by adopting the elastic buffer element 230, when the engaging teeth of the second rotating element 322 are not aligned with the engaging grooves of the engagement section 3212, the second elevating element 332 compresses the elastic buffer element 230 to avoid continuing pushing the camera module 200. Further, when the engagement section 3212 is rotated such that the engaging grooves are aligned with the engaging teeth of the second rotating element 322, the second elevating element 332 and the elastic buffer element 230 drive the camera module 200 to continue moving, and thus the second rotating element 322 is engaged with the engagement section 3212, thus ensuring the normal usage of the elevating and rotating assembly 300.

In an embodiment, another cable through hole is formed in the second elevating element 332. Accordingly, the data line connected to the camera passes through the connecting portion 220 and the cable through hole in sequence, so as to be connected to a processor in the body 100, thus realizing the data transmission.

In an embodiment, the terminal device further includes a reducer, and an output shaft of the driving element 310 is connected to the first transmission element 323 and the first elevating element 331 by the reducer. In this way, rotation speeds of the first transmission element 323 and the first elevating element 331 are suitable, and the elevating and rotating assembly 300 drives the camera module 200 to move up and down, and/or rotate stably.

In an embodiment, the terminal device further includes a guide member fixed in the body 100. A guiding hole having an axis parallel with the ejection direction of the camera module 200 is formed in the guide member. The connecting portion 220 of the camera module 200 is inserted in the guiding hole. By guiding the ejection and the retraction of the camera module 200 via the guide member, the stability of the ejection and the retraction of the camera module 200 is optimized.

In some embodiments shown in FIG. 5 and FIG. 6, the guide member includes a guiding ring 510, and a central cavity of the guiding ring 510 is configured as the guiding hole. The connecting portion 220 is inserted in the guiding ring 510. Optionally, the guiding ring 510 and a bracket 530 of the driving element 310 are integrally formed and fixed in the body 100. The first rotating element 321 and the first elevating element 331 are also mounted to the bracket 530 so as to improve the structural integration and guarantee the structural stability.

Further, in some embodiments, a guiding groove is formed in an inner wall of the guiding ring 510 and penetrates through the guiding ring 510 in an axial direction, and the connecting portion 220 is provided with a guiding key 520 fitted with the guiding groove. During the ejection or the retraction of the camera module 200, the guiding key 520 is inserted into the guiding groove and moves into or out of the guiding ring 510 along the guiding groove. In this way, a position of the camera module 200 is limited in a circumferential direction so as to ensure the smooth ejection and retraction of the camera module 200.

In summary, with reference to FIG. 1 to FIG. 6, by taking an example that the initial position of the camera module 200 ejected out of the body 100 is the front image capturing position, a using method of the terminal device provided in embodiments of the present disclosure is described as follows.

When the camera module 200 is started, the camera module 200 is driven by the elevating and rotating assembly 300 to be ejected out of the body 100. Then, the camera module 200 continues moving up and rotates synchronously under the action of the elevating and rotating assembly 300 until arriving at the rear image capturing position.

When the camera module 200 is retracted, driven by the elevating and rotating assembly 300, the camera module 200 is directly retracted into the body 100 through the hole 121 for camera ejection and retraction from the front image capturing position. Or, driven by the elevating and rotating assembly 300, the camera module 200 moves down while rotating from the rear image capturing position, until arriving at the front image capturing position, and then is retracted into the body 100 through the hole 121 for camera ejection and retraction.

Certainly, it is also optional that the initial position of the camera module 200 ejected out of the body 100 is the rear image capturing position, and the camera module 200 is driven by the elevating and rotating assembly 300 to further move up and rotate to the front image capturing position.

In addition, with the terminal device according to the embodiments of the present disclosure, it is optional that the camera module 200 is driven by the elevating and rotating assembly 300 to rotate during the image capturing, so as to realize a panorama image capturing. The elevating and rotating assembly 300 can stably drive the camera module 200 to rotate, hence realizing a good effect of the panorama image capturing.

The terms "first" and "second" are used for descriptive purposes only and are not to be construed as indicating or implying a relative importance or implicitly indicating the number of technical features indicated. Thus, elements referred to as "first" and "second" can include one or more of the features either explicitly or implicitly. In the description of the present disclosure, "a plurality" indicates two or more unless specifically defined otherwise.

Relative terms such as "below" or "above" or "upper" or "lower" or "vertical" or "horizontal" can be used herein to describe a relationship of one element, layer, or region to another element, layer, or region as illustrated in the drawings. It will be understood that these terms and those discussed above are intended to encompass different orientations of the device in addition to the orientation depicted in the drawings.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It is to be understood that "multiple" mentioned in the present disclosure refers to two or more than two. "And/or" describes an association relationship of associated objects and represent that three relationships can exist. For example, A and/or B can represent three conditions, i.e., independent existence of A, coexistence of A and B and independent existence of B. Character "/" usually represents that previous and next associated objects form an "or" relationship.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A terminal device, comprising:
a body comprising a side enclosure provided with a hole for camera ejection and retraction;
a camera module arranged in the body and configured to be ejected out of the body or retracted into the body through the hole for camera ejection and retraction; and
an elevating and rotating assembly connected to the camera module, and configured to push the camera module to be ejected out of the body or retracted into the body through the hole for camera ejection and retraction, and to drive the camera module located outside the body to rotate along with the ejection or the retraction,
wherein the elevating and rotating assembly comprises:
a driving element;
a rotation transmitting element connected to the driving element and configured to drive the camera module to rotate; and
an elevation transmitting element connected to the driving element and configured to drive the camera module to move up and down,
wherein the rotation transmitting element comprises:
a first rotating element connected to the driving element and configured to rotate along with the driving element; and
a second rotating element configured to be engaged with the first rotating element,
wherein the second rotating element is disposed to the camera module and configured to be ejected along with the camera module to be engaged with the first rotating element, so as to drive the camera module to rotate,
wherein the first rotating element comprises a support section and an engagement section disposed in sequence along an ejection direction of the camera module;
an end of the support section away from the hole for camera ejection and retraction is connected to the driving element in a transmission way; and
the engagement section is disposed to another end of the support section, and located at a side of the second rotating element close to the hole for camera election and retraction before the camera module is started,
wherein when the camera module is not started, a distance between the second rotating element and the engagement section in the ejection direction of the camera module is greater than a distance by which the whole camera module is ejected out of the body.

2. The terminal device according to claim 1, wherein the camera module has a front image capturing position and a rear image capturing position, and the elevating and rotating assembly is configured to drive the camera module to switch between the front image capturing position and the rear image capturing position.

3. The terminal device according to claim 1, wherein the terminal device further comprises a distance sensor, the distance sensor comprises an emitting portion and a receiving portion, one of the emitting portion and the receiving portion of the distance sensor is disposed to the engagement section, and the other one thereof is disposed to the second rotating element.

4. The terminal device according to claim 1, wherein the rotation transmitting element further comprises:
a first transmission element disposed to an output end of the driving element; and
a second transmission element disposed to an end of the support section away from the engagement section,
wherein the first transmission element and the second transmission element are configured to be engaged for transmission.

5. The terminal device according to claim 1, wherein the elevation transmitting element comprises:
a first elevating element arranged along the ejection direction of the camera module, connected to the driving element and configured to rotate along with the driving element; and
a second elevating element connected to the first elevating element and configured to move along a length direction of the first elevating element.

6. The terminal device according to claim 5, wherein the second elevating element is fitted over the support section and connected to the camera module.

7. The terminal device according to claim 5, wherein the first elevating element is configured as a thread rod, the second elevating element has a threaded hole, and the first elevating element is threadedly connected in the threaded hole of the second elevating element.

8. The terminal device according to claim 5, wherein the camera module comprises:
a main portion encapsulating a camera therein; and
a connecting portion protruding from the main portion, wherein the second rotating element is disposed to a part of the connecting portion away from the main portion.

9. The terminal device according to claim 8, wherein the camera module further comprises an elastic buffer element having an end connected to the connecting portion and another end connected to the second elevating element, and the elastic buffer element is configured to be stretched or contracted along the ejection direction of the camera module.

10. The terminal device according to claim 9, wherein the elastic buffer element is configured as a spring.

11. The terminal device according to claim 9, wherein the terminal device further comprises a guide member fixed in the body, and the guide member is provided with a guiding hole having an axis parallel with the ejection direction of the camera module, and the connecting portion is inserted in the guiding hole and configured to move along an axial direction of the guiding hole.

12. The terminal device according to claim 11, wherein the guide member comprises a guiding ring, a central cavity of the guiding ring is configured as the guiding hole, and the connecting portion is inserted in the guiding ring.

13. The terminal device according to claim 12, wherein the driving element, the first rotating element and the first elevating element are mounted to a bracket fixed in the body, and the guiding ring is integral with the bracket.

14. The terminal device according to claim 8, wherein the camera comprises at least one of a telescope camera, a wide scope camera, a fish eye lens, and a macro lens, and the main portion is further configured to encapsulate a flash light therein.

15. The terminal device according to claim 1, wherein the body comprises a display surface and a back cover connected to two opposite sides of the side enclosure, respectively,
the display surface, the side enclosure and the back cover enclose an inner cavity, and the camera module and the elevating and rotating assembly are mounted in the inner cavity.

16. A terminal device, comprising:
a body comprising a side enclosure provided with a hole for camera ejection and retraction;
a camera module arranged in the body and configured to be ejected out of the body or retracted into the body through the hole for camera ejection and retraction; and
an elevating and rotating assembly connected to the camera module, and configured to push the camera module to be ejected out of the body or retracted into the body through the hole for camera ejection and retraction, and to drive the camera module located outside the body to rotate along with the ejection or the retraction,
wherein the elevating and rotating assembly comprises:
a driving element;
a rotation transmitting element connected to the driving element and configured to drive the camera module to rotate; and
an elevation transmitting element connected to the driving element and configured to drive the camera module to move up and down,
wherein the rotation transmitting element comprises:
a first rotating element connected to the driving element and configured to rotate along with the driving element; and
a second rotating element configured to be engaged with the first rotating element,
wherein the second rotating element is disposed to the camera module, and configured to be ejected along with the camera module to be engaged with the first rotating element, so as to drive the camera module to rotate,
wherein the first rotating element comprises a support section and an engagement section disposed in sequence along an ejection direction of the camera module;
an end of the support section away from the hole for camera ejection and retraction is connected to the driving element in a transmission way; and
the engagement section is disposed to another end of the support section, and located at a side of the second rotating element close to the hole for camera ejection and retraction before the camera module is started,
wherein the terminal device further comprises a distance sensor, the distance sensor comprises an emitting portion and a receiving portion, one of the emitting portion and the receiving portion of the distance sensor is disposed to the engagement section, and the other one thereof is disposed to the second rotating element.

17. A terminal device, comprising:
a body comprising a side enclosure provided with a hole for camera ejection and retraction;
a camera module arranged in the body and configured to be ejected out of the body or retracted into the body through the hole for camera ejection and retraction; and
an elevating and rotating assembly connected to the camera module, and configured to push the camera module to be ejected out of the body or retracted into the body through the hole for camera ejection and retraction, and to drive the camera module located outside the body to rotate along with the ejection or the retraction,
wherein the elevating and rotating assembly comprises:
a driving element;
a rotation transmitting element connected to the driving element and configured to drive the camera module to rotate; and
an elevation transmitting element connected to the driving element and configured to drive the camera module to move up and down,
wherein the rotation transmitting element comprises:

a first rotating element connected to the driving element and configured to rotate along with the driving element; and a second rotating element configured to be engaged with the first rotating element, wherein the second rotating element is disposed to the camera module, and configured to be ejected along with the camera module to be engaged with the first rotating element, so as to drive the camera module to rotate, wherein the first rotating element comprises a support section and an engagement section disposed in sequence along an ejection direction of the camera module;

an end of the support section away from the hole for camera ejection and retraction is connected to the driving element in a transmission way; and the engagement section is disposed to another end of the support section, and located at a side of the second rotating element close to the hole for camera ejection and retraction before the camera module is started, wherein the elevation transmitting element comprises:

a first elevating element arranged along the ejection direction of the camera module, connected to the driving element and configured to rotate along with the driving element; and a second elevating element connected to the first elevating element and configured to move along a length direction of the first elevating element, wherein the second elevating element is fitted over the support section and connected to the camera module.

* * * * *